United States Patent [19]
Morita et al.

[11] 4,303,310
[45] Dec. 1, 1981

[54] ELECTROCHROMIC DISPLAY DEVICE

[75] Inventors: Hiroshi Morita, Machida; Hiroshi Washida, Yokohama, both of Japan

[73] Assignee: Tokyo Shibaura Denki Kabushiki Kaisha, Kawasaki, Japan

[21] Appl. No.: 45,334

[22] Filed: Jun. 4, 1979

[30] Foreign Application Priority Data

Jun. 5, 1978 [JP] Japan .................................. 53-66689

[51] Int. Cl.³ ............................................... G02F 1/17
[52] U.S. Cl. .................................................. 350/357
[58] Field of Search ........................... 350/357; 29/570

[56] References Cited
U.S. PATENT DOCUMENTS 3,708,220  1/1973  Meyers et al.
4,123,841  11/1978  Yano et al. ........................... 350/357
4,170,406  10/1979  Giglia et al. ......................... 350/357
4,233,339  11/1980  Leibowitz et al. ............. 350/357 X

OTHER PUBLICATIONS

Sichel et al., "Electrochromism in the Composite Material Au-WO₃", *Applied Physics Letters*, vol. 31, No. 2, Jul. 15, 1977, pp. 109-111.
Schirmer et al., "Dependence of WO₃ Electrochromic Absorption on Crystallinity", *J. Electrochem. Soc. of Solid-State Science and Technology*, May 1977, pp. 749-753.
Randin, "Chemical and Electrochemical Stability of WO₃ Electrochromic Films in Liquid Electrolytes", *J. of Electronic Materials*, vol. 7, No. 1, pp. 47-63, 1978.
Journal of Electronic Materials, vol. 7, No. 1, pp. 47-63; J. Randin; 1978.

*Primary Examiner*—James W. Davie
*Attorney, Agent, or Firm*—Cushman, Darby & Cushman

[57] ABSTRACT

An electrochromic display device comprises a display electrode, a counter electrode spaced from the display electrode, an electrolyte filled in the space between the display electrode and the counter electrode, and an electrochromic coloring layer formed on the display electrode to constitute a display section. That surface of the coloring layer which contacts the electrolyte has a higher density than that of the remaining portion. Preferably, both surface portions of the coloring layer which contact the electrolyte and the display electrode, respectively are more dense than the remaining portion.

13 Claims, 4 Drawing Figures

ELECTROCHROMIC DISPLAY DEVICE

This invention relates to an improved display device utilizing electrochromic phenomenon.

Some substances are colored if applied with electric current. This coloring is called "electrochromic phenomenon," and substances undergoing this phenomenon are called "electrochromic material." The color of an electrochromic material is bleached by flow of current in reverse direction. The electrochromic phenomenon is generally thought to accompany formation of color centers of oxidation-reduction reaction.

Organic and inorganic electrochromic materials are known. U.S. Pat. No. 3,806,299 names a viologen salt as a typical organic electrochromic material. U.S. Pat. No. 3,712,710 discloses oxides of transition metals such as tungsten oxide and molydbenum oxide as typical inorganic electrochromic materials. Generally, these metal oxides are used together with electrolytes such as sulfuric acid, phosphoric acid and lithium perchlorate solution.

Recently, many attempts have been made to apply the electrochromic phenomenon to a display cell. Such as display cell is so constructed as shown in the appended FIG. 1. A coloring region 1 comprising an electrochromic layer and an electrolyte is formed between a pair of electrodes 2 and 3. The electrode 2 is constituted by a transparent conductive film 4 contacting the coloring region 1 and a transparent substrate 5 on which the film 4 is formed. The film 4 is cut to have a pattern denoting numerals, letters, symbols, etc. and the substrate 5 is a glass plate or the like. Likewise, the electrode 3 is constituted by a substrate 6 and a conductive film 7 formed on the substrate 6 and contacting the coloring region 1. A spacer 8 of an insulating material is provided between the electrodes 2 and 3 and contacting the periphery of the coloring region 1. Between the electrodes 2 and 3, voltage is applied reversibly by actuating a switch 9 connected to a power source 10, thereby to color and bleach the coloring region 1 alternatively. The display cell becomes a transmission type if the substrate 6 and film 7 of the electrode 3 are formed to transparent material. It becomes a reflection type if the electrode 3 is formed of opaque material or if a colored background sheet is stretched within the electrolyte. If the conductive film 7 is made transparent, indium oxide, tin oxide etc. are suitable materials. If the film 7 is made opaque, stainless steel, tantalum, platinum etc. may be used.

In general, an electrochromic material absorbs ambient light to perform a so-called "passive display" which depends on the color density. Owing to the passive display, eyes do not get tired, and the letters etc. displayed can be seen clearly regardless of visual angle. In addition, the color displayed does not disappear even if the display cell has been turned off, since the display cell works as a memory device. Because of these advatanges, the electrochromic display device is expected to be employed in various fields.

The conventional electrochromic display device is, however, not satisfactorily durable. This is because that part of the electrochromic material (e.g. $WO_3$) in which electric field likely to concentrate will be dissolved after the switch has been actuated about $10^6$ times to color and bleach the electrochromic material. As a rsult, the electrodes are exposed to the electrolyte and eventually reduced and dissolved by the electrolyte, whereby the display cell ceases functioning.

It is an object of this invention to provide an electrochromic display device which is long durable and highly responsive.

According to this invention, there is provided an electrochromic display device which comprises a display electrode; a counter electrode spaced from the display electrode; an electrolyte filled in the space between the display electrode and the counter electrode and an electrochromic coloring layer formed on the display electrode to constitute a display section. That surface portion of the coloring layer which contacts the electrolyte has a higher density than that of the remaining portion. Preferably, both surface portions of the coloring layer which contact the electrolyte and the display electrode, respectively, are more dense than the remaining portion.

This invention can be more fully understood from the following detailed description when taken in conjunction with the accompanying drawings, in which.

Now referring to FIGS. 2 and 3, an embodiment of this invention will be described.

Figure 1:
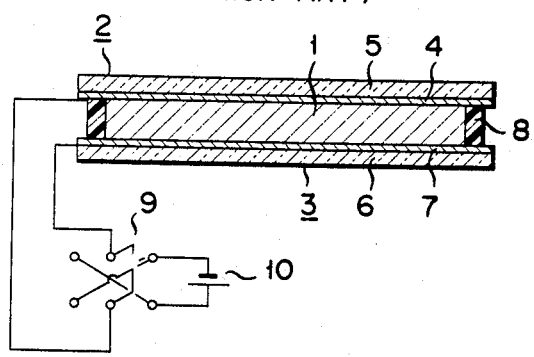
FIG. 1 is a cross sectional view of a known electrochromic display device.
Figure 2:
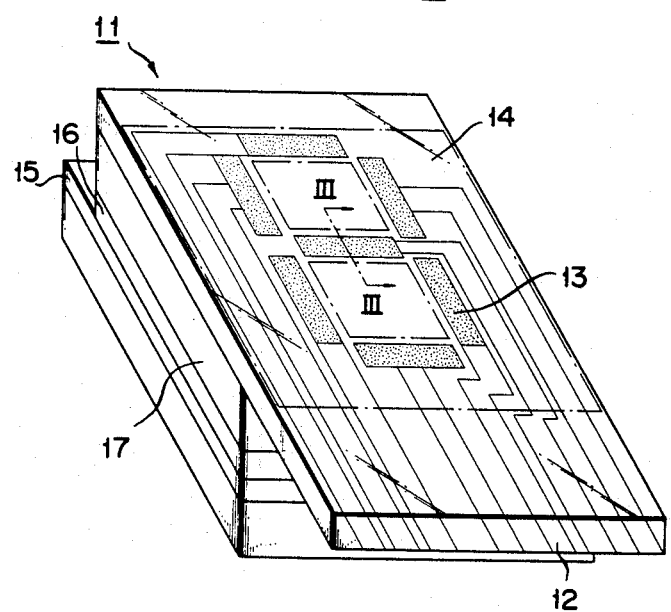
FIG. 2 is a perspective view of an electrochromic display device according to this invention.

FIG. 2 shows a one-digit display cell having seven display segments. A pair of parallel glass plates are spaced by 1.0 mm and sealed together with an epoxy adhesive at four sides, thus constituting a plate-shaped envelope 11. On the ceiling of the envelope 11, seven display electrods of tin oxide are arranged in a specific pattern and seven leads 12 are connected to the display electrodes, respectively. On each of the display electrodes a tungsten oxide film is formed 0.3 micron thick to function as an electrochromic coloring layer 13. An insulative film 14 of silicone varnish is provided to protect the electrodes, leads and coloring layers from an electrolyte. On the entire floor of the envelope 11, a tantalum film is formed by sputtering to work as a counter electrode 15. A tungsten oxide film is formed 0.3 micron thick on the counter electrode 15 so as to function as an electrochromic coloring layer 16.

The envelope 11 is filled with an electrolyte 17. The electrolyte 17 is a gel mixture of white titanium oxide powder, a thickening agent and a solution consisting of propylen carbonate solvent and dehydrated lithium perchlorate. The titanium oxide power provides a white background. The concentration of the solution is 1 mol/liter.

Figure 3:
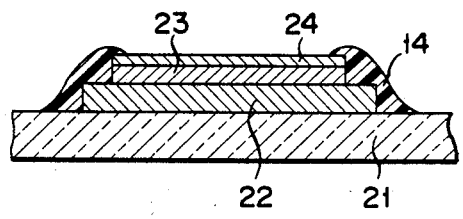
FIG. 3 is a cross sectional view of the device shown in FIG. 2, taken along line III—III in FIG. 2.

FIG. 3 is a cross sectional view of the one-digit display cell, taken along line III—III in FIG. 2. The coloring layer 13 formed on a display electrode 22 on the glass plate or substrate 21 is constituted by two layers, i.e. a layer 23 formed 0.27 micron thick by vapor deposition and a layer 24 formed 0.03 micron thick by sputtering. The tungsten oxide layer 23, which is formed by vapor deposition, is porous, and the tungsten oxide film 24, which is formed by sputtering, is crystallized and more dense than the layer 23. The porous layer 23 is thus protected by the dense layer 24 from the electrolyte 17. The insulative film 14 covers the four sides of the display electrode 22, the porous layer 23 and the dense layer 24. Thus, the coloring layer 13 is hardly dissolved by the electrolyte 17. X-ray diffraction shows that the dense layer 24 is indeed crystallized and that the porous layer 24 is amorphous. To color the electrochromic layer 13, current is made to flow in one direction between the display electrode 22 and the counter electrode 15. To bleach the layer 13, current is made to flow in reverse direction between the electrodes 22 and 15. Since the dense layer 23 is thin, lithium ions in the electrolyte 17 can smoothly enter and leave the electrochromic coloring layer 13, the one-digit display cell remains sufficiently responsive to input current.

Now referring to FIG. 4, another embodiment of this invention will be described.

Figure 4:
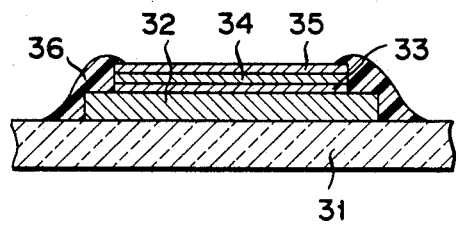
FIG. 4 is a cross sectional view of another embodiment of this invention.

FIG. 4 is a cross sectional view of a part of a one-digit display cell having seven display segments. The cell comprises a substrate 31, seven display electrodes 32 (only one of which is shown in FIG. 4) arranged on the substrate 31 in a specific pattern and seven electrochromic coloring layers (only one of which is shown in FIG. 4) formed 0.3 micron thick on the display electrodes 32, respectively. Each coloring layer is constituted by three tungsten oxide layers, i.e. a layer 33 formed 0.03 micron thick by sputtering, a layer 34 formed 0.24 micron thick by vapor deposition and a layer 35 formed 0.03 micron thick by sputtering, as illustrated in FIG. 4. As in the embodiment of FIGS. 2 and 3, an insulative film 36 covers the four sides of the display electrode 32 and the coloring layer.

In the one-digit display cell of FIG. 4, both surface portions of the coloring layer which contact an electrolyte and the display electrode 32, respectively are dense, crystallized tungsten oxide layers. The lithium ions in the electrolyte do not therefore enter the coloring layer too deep or affect the display electrode 32.

The electrochromic coloring layer of the above-described embodiments is constituted by two or more poros and dense layers. Instead, the coloring layer may be a single layer of which density continuously changed from on surface to the other, thereby to achieve the same effects as obtained in the above-mentioned embodiments. To form an electrochromic coloring layer having such a density profile, vapor deposition may be carried out in the following manner.

To render the coloring layer increasing dense, tungsten oxide is vapor-deposited on a substrate, while gradually heating the substrate room temperature to 300° C. To make the coloring layer progressively coarse, tungsten oxide is vapor-deposited on a substrate, while cooling the substrate from 300° C. to room temperature little by little. As reported in a thesis No. 28a-K-3 presented in the 24th Spring Conference of the Japan Society of Applied Physcis, May 28, 1977, the following relation is observed between the temperature of a substrate and the packing density of tungsten oxide:

| Temperature of Substrate | Packing Density of WO$_3$ |
| --- | --- |
| Room temperature | 0.57 |
| 100° C. | 0.71 |
| 200° C. | 0.76 |
| 300° C. | 0.84 |

By using above mentioned techniques, a single electrochromic layer, which is formed more smoothly than a layer consisting of two or three layers having different densities, is attained.

To form an electrochromic coloring layer constituted by, for example, two layers of different packing densities, the following method may be employed. First, tungsten oxide is vapor-deposited on a display electrode formed on a substrate under pressure of $5 \times 10^{-4}$ torr., while maintaining the substrate at, for example, 200° C., thus forming a relative dense layer having a packing density of 0.6 to 0.8. Then, tungsten oxide is vapor-deposited in an argon atmosphere or an argon-oxygen (10%) atmosphere of $10^{-3}$ to $5 \times 10^{-3}$ torr., while maintaining the substrate at the same temperature, thus forming a relatively coarse layer having a packing densityof 0.4 to 0.6. To form an electrochromic coloring layer which is progressively dense from one surface to the other, tungsten oxide is vapor-deposited on a display electrode formed on a substrate while maintaining the substrate at the same temperature and changing the pressure of the atmosphere little by little.

What we claim is:

1. An electrochromic display device comprising:
   a display electrode;
   an electrochromic coloring layer formed on the display electrode to constitute a display section and having a first surface portion in contact with the display electrode and a second surface portion;
   a counter electrode spaced from the display electrode; and
   an electrolyte within the space between the display section and the counter electrode, the electrolyte being in contact with the second surface portion of the electrochromic coloring layer;
   the second surface portion of said coloring layer which contacts the electrolyte having a higher density than that of the remaining portion of the electrochromic coloring layer.

2. An electrochromic display device according to claim 1, wherein the first surface portion of the electrochromic coloring layer which contacts the display electrode has a higher density than the remaining portion of the electrochromic coloring layer excluding the second surface portion thereof which contacts the electrolyte.

3. An electrochromic display device according to claim 1, wherein the electrochromic coloring layer comprises a first layer of a low density and a second layer formed on the first layer and having a higher density than that of the first layer.

4. An electrochromic display device according to claim 2, wherein the electrochromic coloring layer comprises a first layer having a high density, a second layer formed on the first layer and having a lower density than that of the first layer and a third layer formed on the second layer and having a higher density than that of the second layer.

5. An electrochromic display device according to claim 1 or 2, wherein the electrochromic coloring layer has a density which changes progressively from one surface thereof to the other.

6. An electrochromic display device according to claim 1 or 2, wherein the electrochromic coloring layer is made of tungsten trioxide.

7. An electrochromic display device according to claim 1 or 2, wherein the electrolyte comprises a lithium perchlorate solution.

8. An electrochromic display device comprising:
   a display electrode;
   a counter electrode spaced from the display electrode;
   an electrolyte filled in the space between the display electrode and the counter electrode; and an electrochromic coloring layer formed on the display electrode to constitute a display section, and having a surface portion in contact with the electrolyte and a surface portion in contact with the display electrode;

that surface portion of the electrochromic coloring layer which contacts the electrolyte having a higher density than that of the remaining portion of the electrochromic coloring layer;

that surface portion of said electrochromic coloring layer which contacts the display electrode having a higher density than the remaining portion of the electrochromic coloring layer excluding said surface portion thereof which contacts the electrolyte.

9. The electrochromic display device according to claim 8, wherein said electrochromic coloring layer of said display section comprises a first layer of a first density and a second layer of a second density higher than said first density formed on the low density layer.

10. The electrochromic display device according to claim 8, wherein said electrochromic coloring layer is constituted by a layer of a high density, a layer of a low density formed on the high density layer and a layer of a high density formed on the low density layer.

11. The electrochromic display device according to claim 8, wherein said electrochromic coloring layer has a density which changes progressively from one surface to the other.

12. The electrochromic display device according to claim 8, wherein said electrochromic coloring layer is made of tungsten trioxide.

13. The electrochromic display device according to claim 8, wherein said electrolyte comprises a lithium perchlorate solution.

* * * * *

Disclaimer 4,303,310.—*Hiroshi Morita*, Tokyo and *Hiroshi Washida*, Yokohama, Japan. ELECTROCHROMIC DISPLAY DEVICE. Patent dated Dec. 1, 1981. Disclaimer filed Apr. 9, 1984, by the assignee, *Tokyo Shibaura Denki Kabushiki Kaisha.*

Hereby enters this disclaimer to claim 1 of said patent.

[*Official Gazette May 22, 1984.*]